United States Patent
Zhu et al.

(10) Patent No.: US 11,402,477 B2
(45) Date of Patent: Aug. 2, 2022

(54) SYSTEM AND METHODS FOR RANGING OPERATIONS USING MODULATED SIGNALS

(71) Applicant: Beijing Voyager Technology Co., Ltd., Beijing (CN)

(72) Inventors: Zhenghan Zhu, Mountain View, CA (US); Yue Lu, Mountain View, CA (US); Yibo Yu, Mountain View, CA (US); Vipul Chawla, Mountain View, CA (US); John K. Wu, Mountain View, CA (US)

(73) Assignee: Beijing Voyager Technology Co., Ltd, Beijing (CN)

( * ) Notice: Subject to any disclaimer, the term of this patent is extended or adjusted under 35 U.S.C. 154(b) by 817 days.

(21) Appl. No.: 16/290,785

(22) Filed: Mar. 1, 2019

(65) Prior Publication Data

US 2020/0278430 A1 Sep. 3, 2020

(51) Int. Cl.
*G01S 7/48* (2006.01)
*G01S 7/4865* (2020.01)
(Continued)

(52) U.S. Cl.
CPC ............ *G01S 7/4865* (2013.01); *G01S 17/89* (2013.01); *G01S 17/931* (2020.01)

(58) Field of Classification Search
USPC ....................................................... 356/5.01
See application file for complete search history.

(56) References Cited

U.S. PATENT DOCUMENTS 9,971,020 B1 5/2018 Maher et al.
10,003,757 B2 * 6/2018 Georgiev ............. H04N 5/2256
(Continued)

FOREIGN PATENT DOCUMENTS

CN 102447911 A 5/2012
CN 104345994 A 2/2015
(Continued)

OTHER PUBLICATIONS

Written Opinion of the ISA for PCT/IB2020/051737 (dated 2020).*
(Continued)

*Primary Examiner* — James R Hulka
(74) *Attorney, Agent, or Firm* — Kilpatrick Townsend & Stockton LLP

(57) ABSTRACT

Methods and apparatus for performing a ranging operation are provided. In one example, an apparatus comprises a transmitter circuit, a receiver circuit, a controller, and a code storage. The controller can obtain a first code from the code storage, determine, from the first code, first timing information and first amplitude information of a corresponding first group of one or more signals, and control the transmitter circuit to transmit the first group of one or more signals based on the first timing information and the first amplitude information. The controller can configure a matched filter based on the first timing information and the first amplitude information, identify return signals of the first group of one or more signals based on processing received signals using the configured matched filter, and perform a ranging operation based on the identified return signals and the first group of one or more signals.

20 Claims, 14 Drawing Sheets

(51) Int. Cl.
*G01S 17/89* (2020.01)
*G01S 17/931* (2020.01)

(56) References Cited

U.S. PATENT DOCUMENTS

| | | | |
|---|---|---|---|
| 10,269,104 B2* | 4/2019 | Hannuksela | G06T 5/002 |
| 10,466,342 B1* | 11/2019 | Zhu | G01S 7/4817 |
| 2015/0334318 A1* | 11/2015 | Georgiev | G01S 17/36 |
| | | | 348/46 |
| 2016/0086318 A1* | 3/2016 | Hannuksela | G01S 17/86 |
| | | | 348/43 |
| 2018/0188358 A1* | 7/2018 | Li | G01S 17/10 |

FOREIGN PATENT DOCUMENTS

| | | |
|---|---|---|
| CN | 105409298 A | 3/2016 |
| CN | 107430195 A | 12/2017 |

OTHER PUBLICATIONS

International Search Report PCT/IB2020/051737, dated May 28, 2020, 6 pages.
Written Opinion of the International Search Authority for PCT/IB2020/051737, dated May 28, 2020, 4 pages.

\* cited by examiner

SYSTEM AND METHODS FOR RANGING OPERATIONS USING MODULATED SIGNALS

RELATED APPLICATION

This patent application is related to patent application Ser. No. 16/290,660, filed on Mar. 1, 2019, which is assigned to the assignee hereof and is herein incorporated by reference in its entirety for all purposes.

BACKGROUND

Ranging operation generally refers to determining a distance between an observer (e.g., a vehicle) and an object. Ranging operation can be found in many applications, such as in a collision avoidance system of a vehicle, among many others.

Ranging operation can be performed using various techniques including, for example, measuring time-of-flight of signals propagating between the observer and the object. Specifically, a transmitter of the observer can transmit a light signal at a first time. The signal can reach and reflect off the object to become a return signal, and the return signal can be detected by a receiver of the observer at a second time. The difference between the first time and the second time can represent a total time-of-flight of the signal. Based on the speed of propagation of the signal, as well as the time-of-flight of the signal, the distance between the observer and the object can be determined. Moreover, based on a ratio of the amplitudes/powers of the transmitted signal and the return signal, the reflectivity of the object can be measured, which can be part of the ranging operation or another standalone operation (e.g., to identify the object).

To determine time-of-flight and/or reflectivity, the observer needs to identify, from received signals, a return signal of a previously-transmitted signal. The observer can then determine the time-of-flight and/or a ratio of amplitudes/powers between the previously-transmitted signal and the return signal. Incorrect identification of the return signal from the received signals can introduce errors to the ranging operation as well as the reflectivity measurement.

BRIEF SUMMARY

In certain embodiments, an apparatus is provided. The apparatus is part of a Light Detection and Ranging (LiDAR) module of a vehicle and comprises a transmitter circuit, a controller, and a code storage. The code storage stores a plurality of codes, each code of the plurality of codes corresponding to a group of signals comprising one or more signals, each code specifying timing information and amplitude information of the one or more signals, the plurality of codes each having a different combination of the timing information and the amplitude information from one another. The controller is configured to: obtain, from the code storage, a first code of the plurality of codes; determine, from the first code, first timing information and first amplitude information of a corresponding first group of one or more signals; determine one or more signal levels of the first group of one or more signals based on the first amplitude information; determine one or more transmission times of the first group of one or more signals based on the first timing information; and control the transmitter circuit to transmit the first group of one or more signals having the one or more signal levels at the one or more transmission times.

In some aspects, the plurality of codes further comprises a second code corresponding to a second group of one or more signals. The first code and the second code have different amplitude information.

In some aspects, the first group of one or more signals comprises a first signal and a second signal. The second group of one or more signals comprises a third signal and a fourth signal. The second code specifies second amplitude information. The first amplitude information specifies the first signal having a first signal level and the second signal having a second signal level. The second amplitude information specifies the third signal having a third signal level and the fourth signal having a fourth signal level. At least one of: the first signal level and the third signal level are specified to be different, or the second signal level and the fourth signal level are specified to be different.

In some aspects, at least one of: the first signal level and the second signal level are specified to be identical; or the third signal level and the fourth signal level are specified to be identical.

In some aspects, the plurality of codes further comprises a second code corresponding to a second group of one or more signals. The first code and the second code have different timing information for transmissions of the first group of one or more signals and the second group of one or more signals.

In some aspects, the first group of one or more signals comprises a first signal and a second signal. The second group of one or more signals comprises a third signal and a fourth signal. The second code specifies second timing information. The first timing information specifies a first time of transmission and a second time of transmission of, respectively, the first signal and the second signal. The second timing information specifies a third time of transmission and a fourth time of transmission of, respectively, the third signal and the fourth signal. At least one of: the first time of transmission and the third time of transmission are specified to be different; or the second time of transmission and the third time of transmission are specified to be different.

In some aspects, the plurality of codes further comprises a second code. The first code have different timing information and different amplitude information than the second code.

In some aspects, the controller is configured to: receive an indication that another vehicle transmits a group of signals corresponding to the first code. Based on the indication, the controller is configured to: obtain, from the code storage, a second code; determine, from the second code, second timing information and second amplitude information of a second group of one or more signals; and control the transmitter circuit to transmit the second group of one or more signals based on the second timing information and the second amplitude information.

In some aspects, the indication is received from a server communicatively coupled with a plurality of vehicles.

In some aspects, the indication is received via a peer-to-peer communication channel with another vehicle.

In some aspects, the controller is configured to generate the first code based on a random function.

In certain embodiments, an apparatus is provided. The apparatus is part of a Light Detection and Ranging (LiDAR) module of a vehicle and comprises a receiver circuit, a controller, and a code storage. The code storage stores a plurality of codes, each code of the plurality of codes corresponding to a group of signals comprising one or more signals, each code specifying timing information and amplitude information of the one or more signals, the plurality of codes each having a different combination of the timing information and the amplitude information from one another. The controller is configured to: obtain, from the code storage, a first code of the plurality of codes, the first code corresponding to a first group of one or more signals previously transmitted by the apparatus; determine, from the first code, first timing information and first amplitude information of the first group of one or more signals; configure a matched filter based on the first timing information and the first amplitude information; receive input signals from the receiver circuit; process the input signals using the matched filter to generate output signals; identify, based on a result of comparing the output signals with a threshold, return signals of the first group of one or more signals corresponding to the first code; and perform a ranging operation based on the identified return signals and the first group of one or more signals.

In some aspects, the controller is configured to identify a subset of the output signals based on a signal level of each signal of the subset of the output signals exceeding the threshold.

In some aspects, the controller is configured to: generate, based on the first code, a first matched filter output signal pattern; and identify, based on comparing the identified subset of output signals with the first matched filter output signal pattern, the return signals of the first group of one or more signals.

In some aspects, the controller is configured to: obtain, based on the first code, a first matched filter output signal pattern from the code storage; and identify, based on comparing the identified subset of output signals with the first matched filter output signal pattern, the return signals of the first group of one or more signals.

In some aspects, the apparatus further includes an analog-to-digital converter (ADC) configured to digitize the input signals. The matched filter is implemented on a digital signal processor to process the digitized input signals.

In some aspects, the matched filter is configured based on a time-reversal operation of the first group of one or more signals corresponding to the first code.

In some aspects, the plurality of codes further comprises a second code that specifies second amplitude information and second timing information of a second group of one or more signals. At least one of: the first amplitude information and the second amplitude information are different; or the first timing information and the second timing information are different.

In certain embodiments, an apparatus is provided. The apparatus is part of a Light Detection and Ranging (LiDAR) module of a vehicle and comprises a transmitter circuit, a receiver circuit, a controller, and a code storage. The code storage stores a plurality of codes, each code of the plurality of codes corresponding to a group of signals comprising one or more signals, each code specifying timing information and amplitude information of the one or more signals, the plurality of codes each having a different combination of the timing information and the amplitude information from one another. The controller is configured to: obtain, from the code storage, a first code of the plurality of codes; determine, from the first code, first timing information and first amplitude information of a corresponding first group of one or more signals; determine one or more signal levels of the first group of one or more signals based on the first amplitude information; determine one or more transmission times of the first group of one or more signals based on the first timing information; control the transmitter circuit to transmit the first group of one or more signals having the one or more signal levels at the one or more transmission times; configure a matched filter based on the first timing information and the first amplitude information; receive input signals from the receiver circuit; process the input signals using the matched filter to generate output signals; identify, based on a result of comparing the output signals with a threshold, return signals of the first group of one or more signals corresponding to the first code; and perform a ranging operation based on the identified return signals and the first group of one or more signals.

In some aspects, the controller is configured to perform the ranging operation based on a difference between the one or more transmission times of the first group of one or more signals at the transmitter circuit and one or more reception times of the identified return signals at the receiver circuit.

BRIEF DESCRIPTION OF THE DRAWINGS

The detailed description is set forth with reference to the accompanying figures.

DETAILED DESCRIPTION

In the following description, various examples of a ranging system will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

A ranging system, such as a Light Detection and Ranging (LiDAR) module, typically includes a transmitter, a receiver, and a controller. The controller can control the transmitter to transmit a signal at a first time. The signal can be reflected off an object to become a return signal. The transmitter can receive the return signal at a second time. The controller can determine a time-of-flight of the signal based on a difference between the first time and the second time, and determine a distance from the object based on the time-of-flight. The controller can also determine a reflectivity of the object based on a ratio of amplitudes/powers between the transmitted light signal and the return signal, and identify the object based on the reflectivity. To measure a time-of-flight of the signal and/or a reflectivity of the object, the controller may identify, from received signals, a return signal of a previously-transmitted light signal. If errors occur in the identification process such that the controller identifies the wrong signal as the return signal and uses the wrong signal to perform time-of-flight and reflectivity measurements, errors in the time-of-flight and reflectivity measurements may result.

There are various sources that can introduce errors to the identification of the return signals. One source of error can be noise signals in the environment, such as ambient light. The receiver may receive ambient light reflected off the object and identify the ambient light as a return signal from a previously-transmitted light signal. Another source of error can be interference caused by return signals (or other unwanted signals) targeted at other vehicles/LiDAR systems. As an example, a first vehicle may transmit a first signal towards an object, which reflects the first signal to generate a first return signal. A second vehicle at a different location may transmit a second signal towards the object, which reflects the second signal to generate a second return signal, but the second vehicle may receive the first return signal before the second return signal. The second vehicle may identify the second return signal as the return signal of the second signal and use the second return signal for time-of-flight and/or reflectivity measurements, which can introduce errors to the measurements.

Conceptual Overview of Certain Embodiments

Figure 3A:
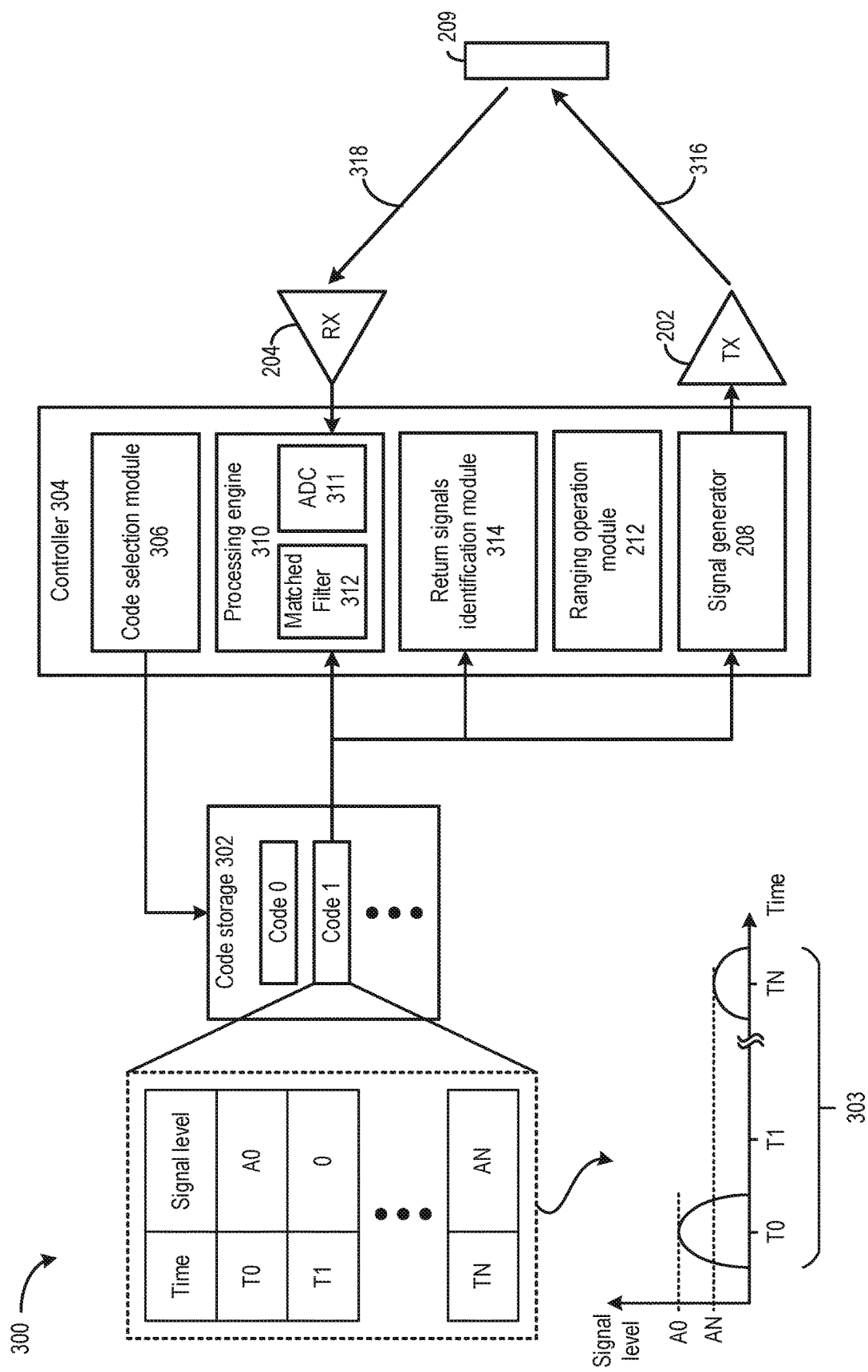
FIG. 3A-FIG. 3D illustrate examples of a ranging system that can be part of FIG. 1, according to embodiments of the present disclosure.

Examples of the present disclosure relate to a ranging system, such as a LiDAR module, that can address the problems described above. An example of a ranging system is illustrated in FIG. 3A. Various embodiments of the ranging system can include a code storage. The code storage may store a plurality of codes, with each code of the plurality of codes corresponding a group of signals to be transmitted within a timing window. Each group of signals may include one or more signals. Each code may specify timing information and amplitude information of the group of signals. The timing information may define, for example, one or more transmission times of the group of signals within the timing window. The amplitude information may define, for example, a signal level for each of the one or more signals within the group of signals.

Figure 3B:
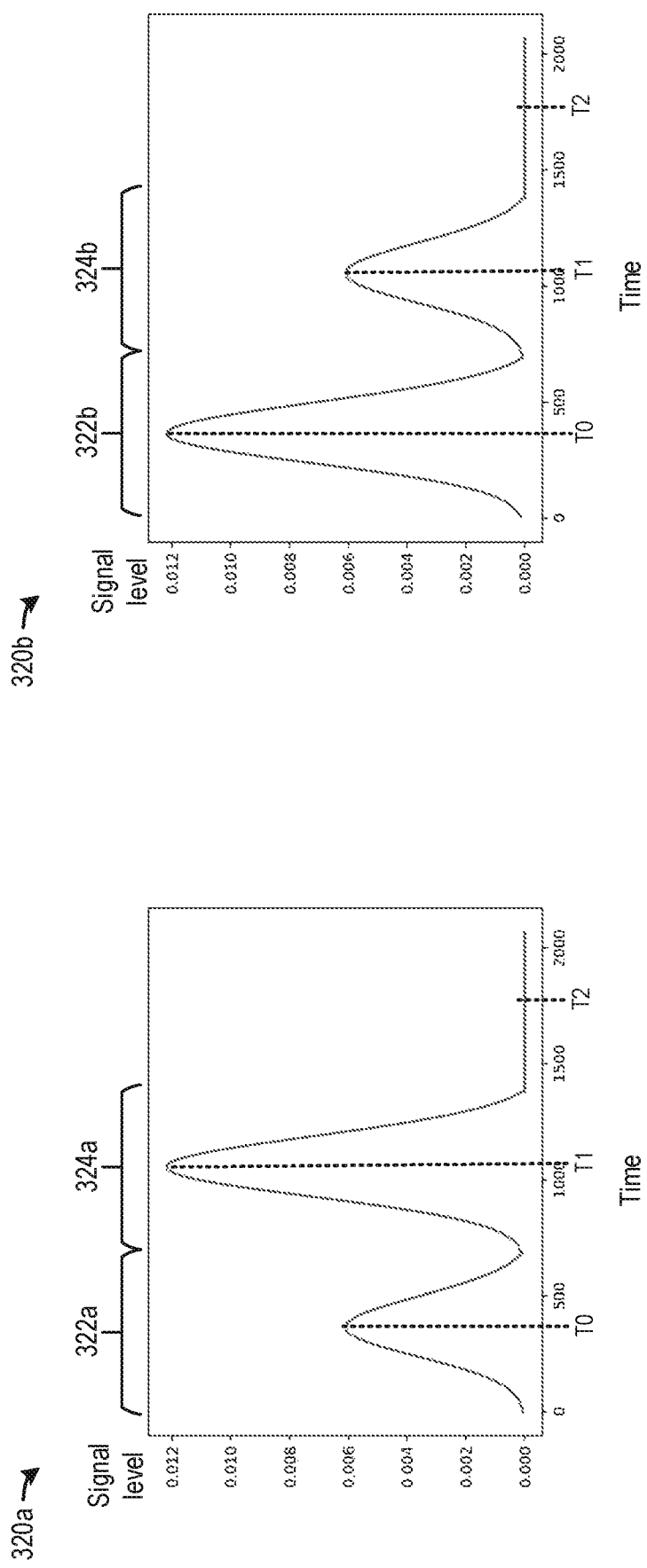
Figure 3C:
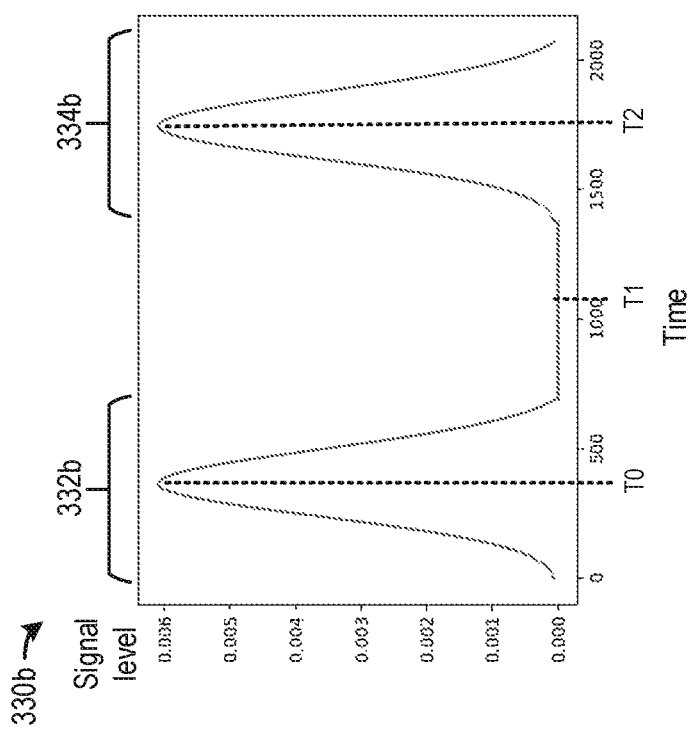
Figure 3C:
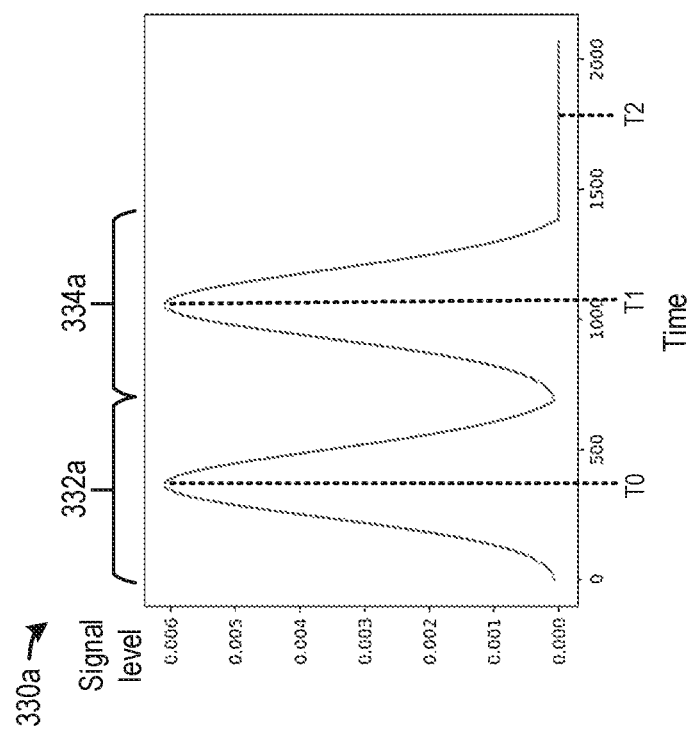
Figure 3D:
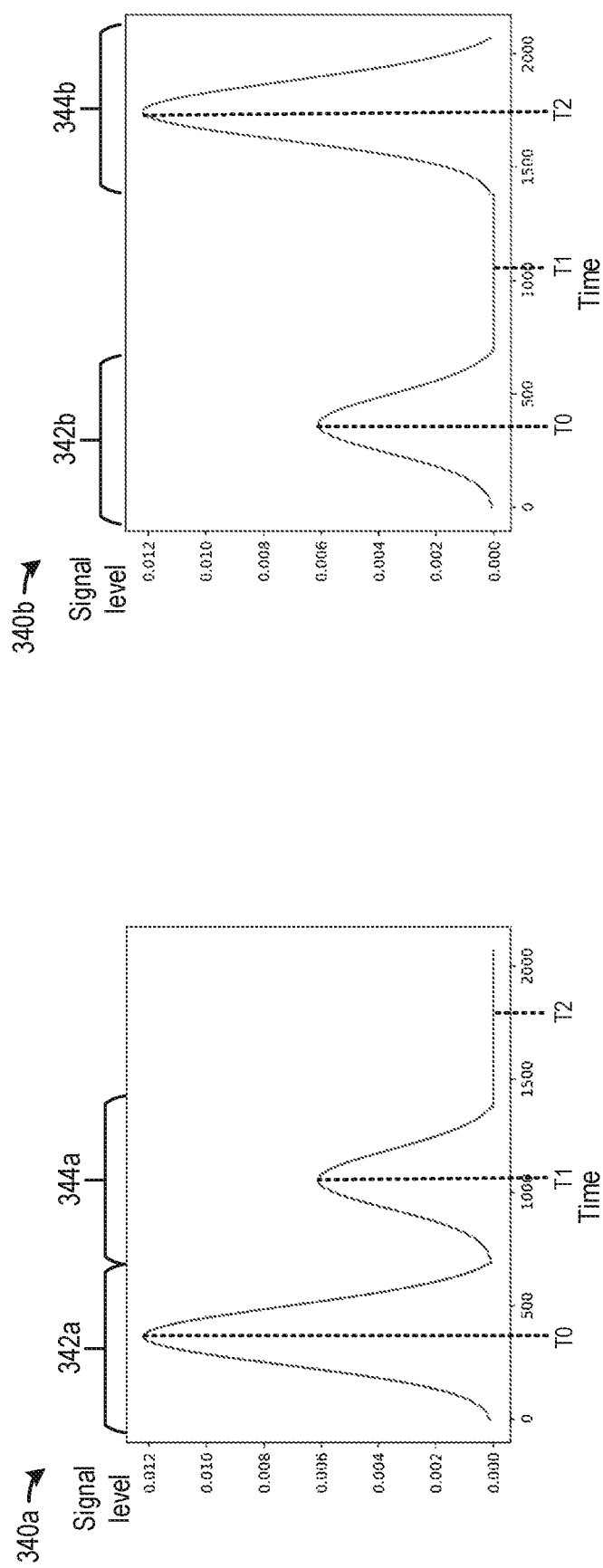

The plurality of codes are configured to assist a receiver in distinguishing among the return signals of different groups of signals corresponding to different codes. The plurality of codes may have different combinations of the timing information and the amplitude information. Return signals of a particular code can have a particular combination of timing and signal levels, based on which a receiver can identify the return signals from received signals. Examples of different combinations of first and second times of transmissions, first and second signal levels are illustrated in FIGS. 3B-3D.

The controller can perform transmission and reception of signals based on the plurality of codes stored in the code storage. Specifically, on the transmitter side, the controller can obtain a first code from the code storage, and can determine first timing information and first amplitude information of a group of signals from the first code. From the first amplitude information, the controller can determine the one or more signal levels of the one or more signals within the group of signals. Moreover, from the first timing information, the controller can determine the one or more transmission times of the one or more signals within the group of signals. The controller can then control the transmitter circuit to transmit the one or more signals having the one or more signal levels at the one or more transmission times.

Moreover, on the receiver side, the controller can also obtain a first code from the code storage based on an indication that the transmitter previously transmitted a group of signals corresponding to the first code. The controller can determine, from the first code, first timing information and first amplitude information of the group of signals, and configure a matched filter based on the first timing information and the first amplitude information. The matched filter can be configured based on a time-reversal of the first code. The matched filter can generate output signals having relatively large signal levels for received signals that match the group of signals corresponding to the first code, whereas the output signals for received signals that do not match the first code typically have relatively low signal levels. Examples of a matched filter and its operations are illustrated in FIGS. 4A-4D. The controller can compare the output signals with a threshold to identify candidate return signals, and then compare the candidate return signals with a reference matched filter output pattern to determine whether the candidate return signals are return signals of the first signal and the second signal. An example of the return signal identification operation is illustrated in FIG. 5. Upon determining that the candidate return signals are return signals of the group of signals, the controller can then perform a ranging operation (e.g., a distance measurement, a reflectivity measurement, etc.) of the object based on the group of signals and the candidate return signals.

A LiDAR module of a vehicle, using the disclosed techniques, can select a code for a ranging operation to mitigate interferences with other LiDAR modules of other vehicles. For example, each vehicle can be assigned a unique static code for a ranging operation, to ensure different vehicles use different codes to perform ranging operations. As another example, the codes used for ranging operations can also be dynamically assigned. For example, a server can be in communication with multiple vehicles that are within certain threshold distances from each other, and can control the LiDAR modules of the vehicles to use different codes to perform ranging operations when the vehicles are still within the threshold distances from each other to avoid interference. When the vehicles are no longer within the threshold distances such that the risk of interference is reduced, the server can control the LiDAR modules of the vehicles to use the same code to perform ranging operations. In some examples, a LiDAR module of a first vehicle can receive an indication from another LiDAR module of a second vehicle (e.g., via peer-to-peer communication, via a broadcast message, etc.) that both vehicles are using the same code for a ranging operation. Based on the indication, the LiDAR module of the first vehicle can switch to another code for the ranging operation, to reduce the risk of interference. In some examples, a LiDAR module can also dynamically change the code with respect to time based on, for example, a random function, which enables the LiDAR modules of different vehicles to use different codes (with certain probabilities) to perform ranging operations.

As described above, the plurality of codes are configured to assist a receiver in detecting the return signals of different groups of signals corresponding to different codes, and to increase the number of available codes. Various techniques can be used to configure the plurality of codes to maximize the likelihood of correct detection of return signals, especially in the presence of noise. For example, the codes can be configured to reduce the side lobes of outputs of a matched filter when processing an input that does not match the coefficients of the matched filter. The LiDAR system can filter out input signals that do not match previously-transmitted signals based on the side lobes of the matched filter output being below a threshold, and the likelihood of correctly identifying the return signals and performing accurate ranging operation can be improved. Moreover, the signal level differences between the codes can be configured based on a resolution of the processing circuits of the controller (e.g., the quantization resolution of an analog-to-digital circuit (ADC)) to ensure that the amplitudes of the output signals from the matched filter between different codes are distinguishable by the controller, while allowing a broad range of amplitudes to be represented by the codes. With such arrangements, the number of codes available can be increased to improve the operation flexibility, while the return signals represented by the codes can still be differentiated by the LiDAR module to reduce interference.

With the disclosed embodiments, one or more signals are transmitted based on a code to perform a ranging operation (e.g., distance measurement, reflectivity measurement, etc.), and different codes can be selected by LiDAR modules of different vehicles to mitigate interference. Based on the selected code, a LiDAR module can distinguish return signals of signals previously-transmitted by that LiDAR module from return signals for other LiDAR modules. The risk of interference introducing errors to the ranging operations can be reduced. All of these can improve the robustness and performance of the LiDAR module over conventional implementations.

Typical System Environment for Certain Embodiments

Figure 1:
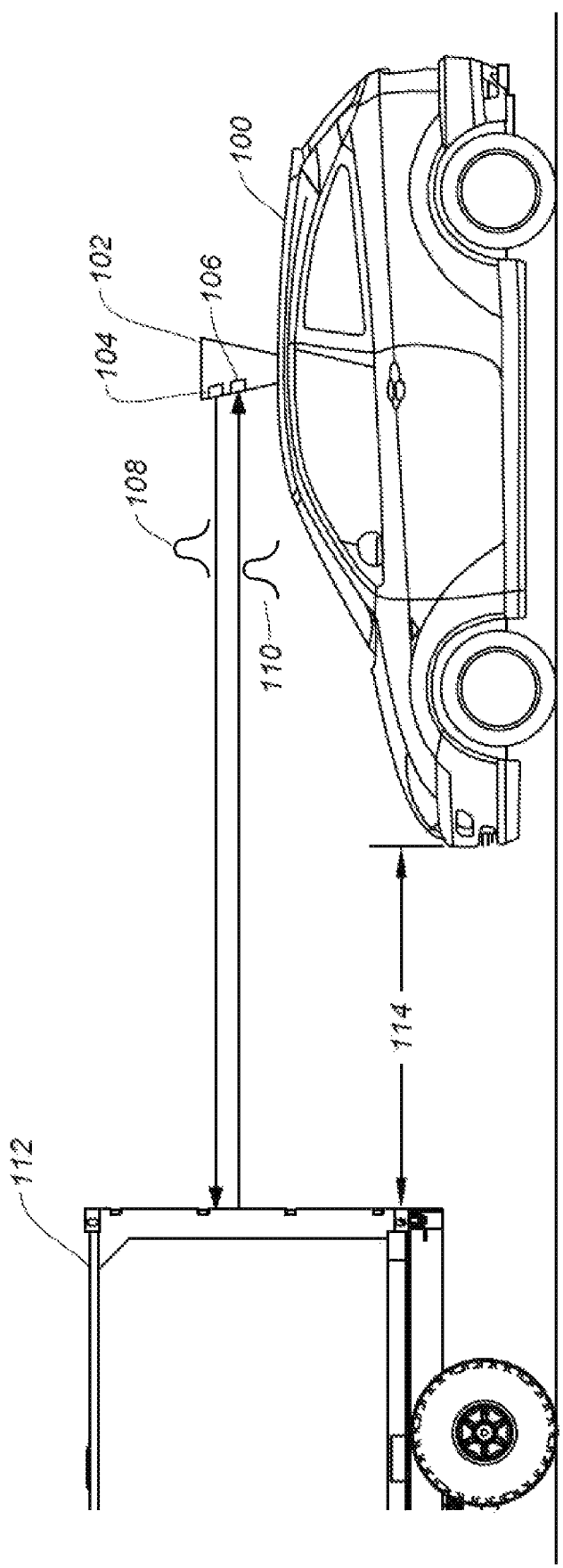
FIG. 1 shows an autonomous driving vehicle utilizing aspects of certain embodiments of the disclosed techniques herein.

FIG. 1 illustrates an autonomous vehicle 100 in which the disclosed techniques can be implemented. Autonomous vehicle 100 includes a ranging system, such as LiDAR module 102. LiDAR module 102 allows autonomous vehicle 100 to perform object detection and ranging in a surrounding environment. Based on the result of object detection and ranging, autonomous vehicle 100 can maneuver to avoid a collision with the object. LiDAR module 102 can include a light steering transmitter 104 and a receiver 106. Light steering transmitter 104 can project one or more light signals 108 at various directions at different times in any suitable scanning pattern, while receiver 106 can monitor for a light signal 110 which is generated by the reflection of light signal 108 by an object. Light signals 108 and 110 may include, for example, a light pulse, a frequency modulated continuous wave (FMCW) signal, an amplitude modulated continuous wave (AMCW) signal, etc. LiDAR module 102 can detect the object based on the reception of light pulse 110, and can perform a ranging determination (e.g., measuring a distance of the object) based on a time difference between light signals 108 and 110. For example, as shown in FIG. 1, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can adjust its speed (e.g., slowing or stopping) to avoid collision with object 112 based on the detection and ranging of object 112 by LiDAR module 102.

Figure 2A:
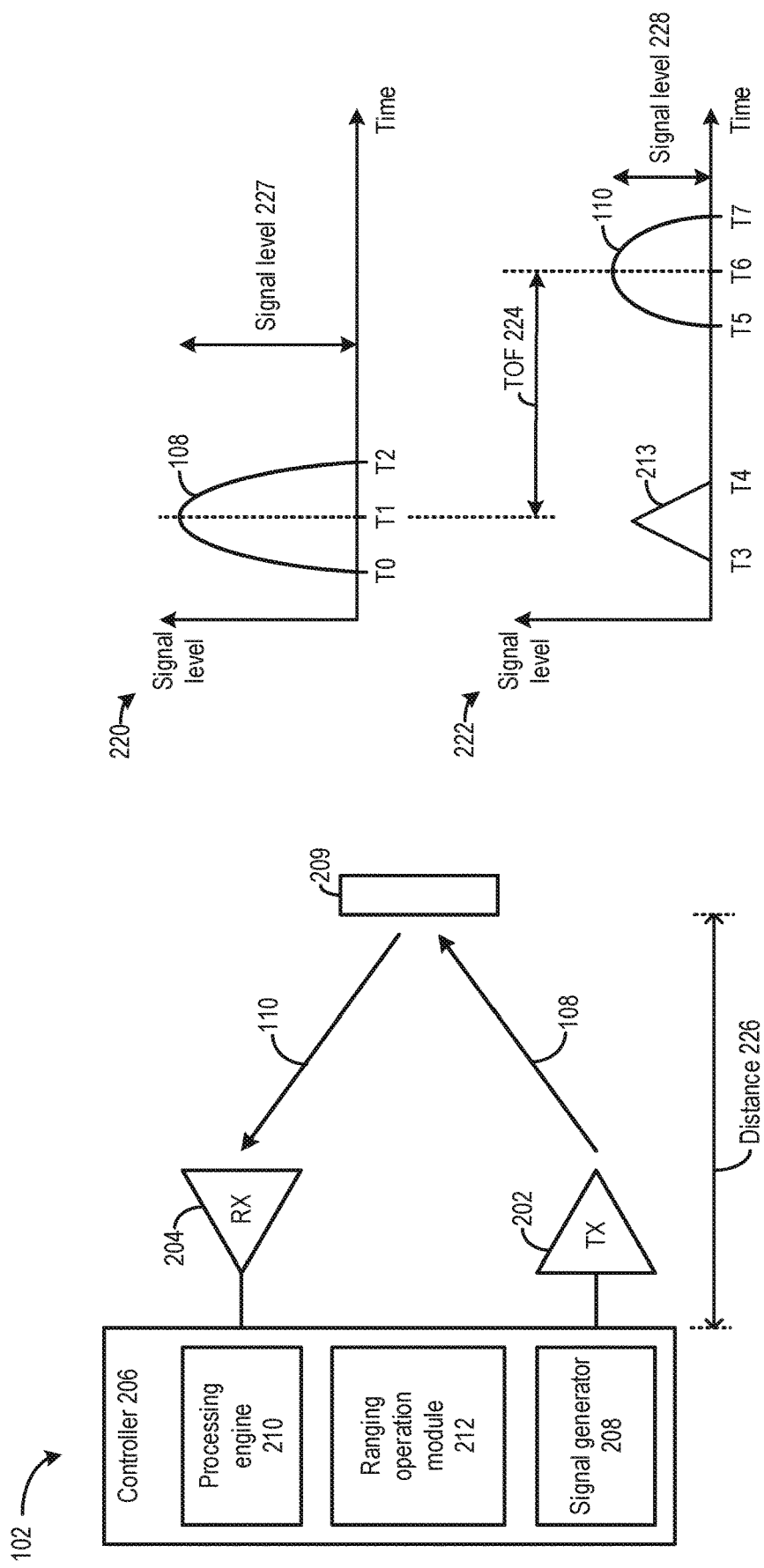
FIG. 2A and FIG. 2B illustrate examples of a ranging system that can be part of FIG. 1.

FIG. 2A illustrates examples of components of a LiDAR module 102. LiDAR module 102 includes a transmitter 202, a receiver 204, and a controller 206. Transmitter 202 may include a light source (e.g., a pulsed laser diode, a source of FMCW signal, a source of AMCW signal, etc.) to transmit light signal 108. Controller 206 includes a signal generator 208 which can determine the amplitude characteristics of light signal 108, as well as the time when transmitter 202 transmits light signal 108. Light signal 108 can propagate to and reflect off target object 209 to form reflected light signal 110. Receiver 204 can detect the reflected light signal 110 together with other signals.

Graphs 220 and 222 illustrate examples of light signal 108 and reflected light signal 110. Referring to graph 220 of FIG. 2A, which shows the output of transmitter 202 with respect to time, signal generator 208 can control transmitter 202 to transmit light signal 108 between times T0 and T2, with light signal 108 peaking at time T1. Light signal 108 can be reflected off target object 209 to become return signal 110. Referring to graph 222 of FIG. 2A, which shows the input signals at receiver 204 with respect to time, receiver 204 can receive light signals including return signal 110 together with other signals (e.g., signal 213). Receiver 204 can include a photodetector (e.g., a photodiode) which can convert received photons into current to represent the received light signals. Processing engine 210 may include a digital signal processor (DSP) to perform the signal processing operations on the received signals. The signal processing operations may include, for example, determining a pattern of changes of the signal level with respect to time, such as an amplitude envelop shape or other amplitude characteristics, of the receive signals. As another example, the processing may include Fast Fourier Transform (FFT) to extract frequency contents of the received signals.

Controller 206 further includes a ranging operation module 212. Ranging operation module 212 can identify return signal 110 from the received signals based on the outputs of processing engine 210, and perform a ranging operation (e.g., distance measurement, reflectivity measurement, etc.) based on the identified return signal 110. For example, ranging operation module 212 can collect the amplitude characteristics and/or frequency contents information of transmitted light signal 108 and received signals from, respectively, signal generator 208 and processing engine 210, and perform a search for reflected light signal 110 in the received signals. The search can be based on, for example, identifying a signal having amplitude characteristics and/or frequency contents that are scaled copies of amplitude characteristics and/or frequency contents of transmitted light signal 108. Referring to graph 222, based on amplitude characteristics, ranging operation module 212 may determine that the received signal 213 between times T3 and T4 is not reflected light signal 110 because it does not have the same amplitude envelop shape as transmitted light pulse 108. Ranging operation module 212 may also identify the received signals between times T5 and T7 as return signal 110 based on the received signals having the same amplitude envelop shape as transmitted light signal 108.

Ranging operation module 212 can perform a ranging operation based on return signal 110. The ranging operation may include, for example, distance measurement, reflectivity measurement, etc. For distance measurement, ranging operation module 212 can determine a time difference between transmitted light signal 108 and reflected light signal 110 to represent time-of-flight (TOF) 224 of light signal 108 between LiDAR module 102 and target object 209. The time difference can be measured between, for example, time T1 when light signal 108 peaks and time T6 when reflected light signal 110 peaks. Based on time-offlight 224 and speed of propagation of light signals, ranging operation module 212 can determine a distance 226 between LiDAR module 102 and target object 209.

Moreover, for reflectivity measurement, ranging operation module 212 can determine a ratio between a signal level 228 of return signal 110 and a signal level 227 of transmitted light signal 108. The reflectivity measurement can be performed based on the distance 226 measured based on time-of-flight 224. Specifically, the signal level of return signal 110 at receiver 204 may vary depending on the measurement distance as well as the reflectivity of the target object. The measurement distance can determine a degree of attenuation of the transmitted light signal 108 along the propagation path from transmitter 202 to target object 209, as well as a degree of attenuation of the reflected light signal 110 along the propagation path from target object 209 back to receiver 204, with shorter measurement distance leading to less attenuation and vice versa. Moreover, the reflectivity of the target object 209 can also determine a percentage of the signal power of light signal 108 reflected by the object as the reflected light signal 110, with a higher reflectivity leading to a larger percentage of reflected light signal power and vice versa. The following equation provides an example relationship between a peak photodetector current at receiver 204, which represents the reflected light signal level at the input of the receiver, and the measurement distance and the target object reflectivity:

$$I_{peak} \propto \frac{\text{Reflectivity}}{\text{Distance}^2} \times e^{-2\gamma \times Distance} \quad \text{(Equation 1)}$$

In Equation 1, the peak photodetector current $I_{peak}$ can be directly proportional to the reflectivity for a given measurement distance. Moreover, $I_{peak}$ is related to a reciprocal of square of the measurement distance as well as a negative exponential function of the measurement distance, which means $I_{peak}$ drops at a very high rate with respect to the measurement distance. Gamma ($\gamma$) can refer to the light absorption coefficient of the atmosphere. With Gamma and distance known, the reflectivity of target object 209 can be determined based on Equation 1.

As described above, to perform a correct ranging operation, ranging operation module 212 needs to correctly identify a return signal of a previously-transmitted light signal to determine a time-of-flight between the signals and/or a ratio of their signal levels. There are various sources that can introduce errors to the identification of the return signals. One source of error can be noise signals in the environment, such as ambient light. The receiver may receive ambient light reflected off the object and identify the ambient light as a return signal from a previously-transmitted light signal. Ranging operation module 212 can reduce the risk of false identification of noise signals as return signals based on, for example, matching the amplitude characteristics and/or frequency contents of the received signals with the previously-transmitted light signal (e.g., light signal 108).

Figure 2B:
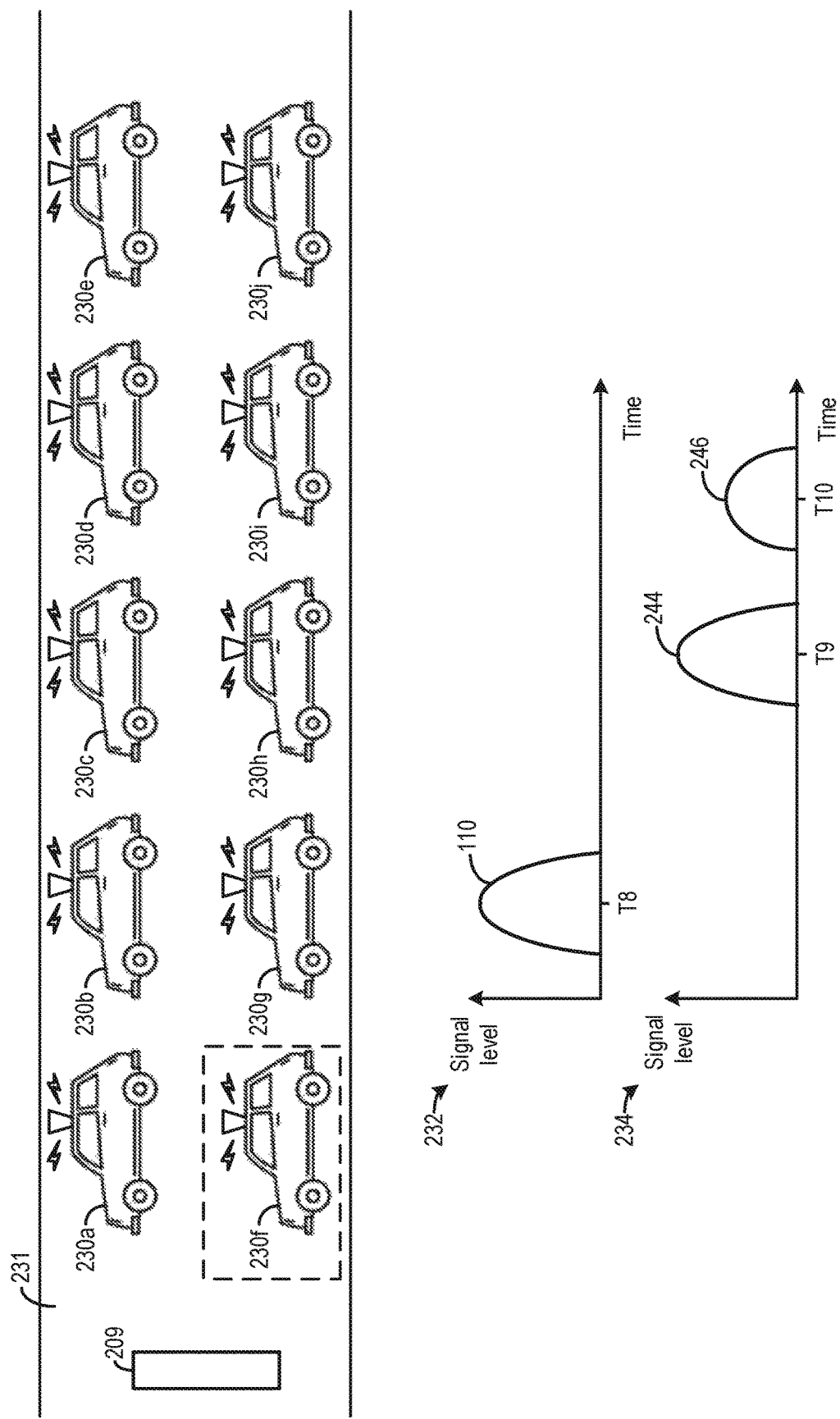

Another source of errors of return signal identification can be interference caused by return signals (or other unwanted signals) targeted at other vehicles/LiDAR systems. Interference can be difficult to mitigate if the return signals for the LiDAR systems have similar amplitude characteristics and/or frequency contents. FIG. 2B illustrates an example of interference. As shown in FIG. 2B, multiple vehicles, including vehicles 230a-230j, may be positioned in the vicinity of each other on a congested road 231. The vehicles may transmit light signal 110 towards object 209 from different positions, and different vehicles may transmit the signal at different times. Graphs 232 and 234 illustrates the transmission and reception of signals by vehicle 230f. As shown in graph 232, vehicle 230f may transmit light signal 110 at time T8. Moreover, as shown in graph 234, vehicle 230f may receive, at time T9, a return signal 244 of the light signal 110 transmitted by vehicle 230f. Vehicle 230f may also receive, at time T10, a return signal 246 of the light signal 110 transmitted by another vehicle (e.g., vehicle 230g) due to the two vehicles being close to each other. Both return signals 244 and 246 may have similar amplitude characteristics (but different signal levels) and/or frequency contents due to both being generated by the reflection of light signal 110. If vehicle 230f incorrectly uses return signal 246, instead of return signal 244, for a ranging operation (e.g., by measuring a time difference between T8 and T10, measuring a ratio of signal levels, etc.), the resulting measurement result may contain error and does not correctly represent, for example, a distance between vehicle 230f and object 209, the reflectivity of object 209 (at least because the distance is incorrect).

Reference is now made to FIG. 3A, which illustrates another example of a ranging system 300 that can be part of LiDAR module 102 that can address the challenges posted by interference. As shown in FIG. 3A, ranging system 300 includes transmitter 202, receiver 204, a code storage 302, and a controller 304. Controller 304 further includes a code selection module 306, a processing engine 310, a return signals identification module 314, in addition to signal generator 208 and ranging operation module 212.

Code storage 302 may store a plurality of codes, with each code of the plurality of codes corresponding a group of signals to be transmitted by transmitter 202 within a timing window. The timing window, as well as the length of each code, can be configured based on a system behavior of LiDAR system 300. For example, LiDAR system 300 may be configured to project signals towards different positions within a field of view based on a scanning pattern within a pre-determined scanning period, and the scanning pattern is to be repeated for each subsequent scanning period. LiDAR system 300 may be configured to transmit a group of signals to scan each position, and the timing window (and the code length) for each group of signals can be determined based on a period allocated for the position within the scanning period.

In addition, each group of signals can include a pre-determined number of signals. The number of signals can be determined based on, for example, the power rating of the signal source (e.g., a laser source), a transmit energy constraint due to safety requirement, etc. For example, assuming that a laser source has a power rating of 1 Watt, each signal within a group of signals has a width of 1 nano-second (ns) and a transmit energy of 1 nano-Joule (nJ) (based on a product between the power rating and signal width). If the total transmit signal energy for each group of signals is constrained to be 4 nano-Joule (nJ), the group of signals can have four or fewer signals.

Each code in code storage 302 can define timing information and amplitude information of the group of signals. As shown in FIG. 3A, the timing information may specify, for example, a time of transmission of each signal within the timing window, whereas the amplitude information may specify the signal level of each signal. For example, code 1 may specify that a signal having a signal level A0 is to be transmitted at time T0, no signal is to be transmitted at time T1, and a signal having a signal level AN is to be transmitted at time TN. The plurality of codes in code storage may have different combinations of the timing information and the amplitude information, such that each group of signals is unique in terms of, for example, the time of transmissions of the signals, the signal levels of the signals, or a combination of both. Each code may be represented in a vector form, with each entry corresponding to a signal level of a signal within the group of signals 303. For example, code 1 in FIG. 3A may be represented by an N-element vector [A0, 0, . . . AN]. Optionally, each code may also specify a width (with respect to time) of each signal within the group of signals, to further expand the variation patterns of the codes.

Code selection module 306 of controller 304 can select a code (e.g., code 1 in FIG. 3A) from code storage 302, and provide the selected code to signal generator 208 to generate a group of signals based on the timing information and the amplitude information specified by the selected code. On the receiver side, code selection module 306 can also provide the selected code to processing engine 310, which can include an analog-to-digital converter (ADC) 311 and a digital signal processor (DSP) to implement a configurable matched filter 312. ADC 311 can convert analog received signals from receiver 204 into digital form, whereas matched filter 312 can process the digital signals to generate output signals. Processing engine 310 can configure matched filter 312 based on the selected code, as to be described in more details below. Moreover, code selection module 306 can also provide the selected code to return signals identification module 314, which can generate a reference output pattern based on the selected code and compare the reference output pattern with the output signals from matched filter 312 to identify return signals that match the selected code.

To perform a ranging operation, signal generator 208 can generate, based on the selected code, a group of signals 316, which can be transmitted by transmitter 202. Group of signals 316 can be reflected by target object 209 to generate return signals 318. Receiver 204 can receive signals including return signals 318, and the received signals can be converted into digital form by ADC 311. Matched filter 312 can be configured based on the selected code, and the configured matched filter can process the digital form of the received signals to generate output signals. The output signals can have patterns that indicate whether the received signals match the selected code. Return signals identification module 314 can identify return signals 318 that match the selected code from the output signals of matched filter 312. Ranging operation module 212 can then perform a ranging operation (e.g., distance measurement, reflectivity measurement, etc.) based on, for example, timing difference and/or a signal level ratio between the identified return signals 318 and the transmitted group of signals 316.

The plurality of codes stored in code storage 302 can be configured to prevent or mitigate interferences between return signals. Referring back to the example of FIG. 2B, the code selection module 306 in the LiDAR module of each of vehicles 230a-230j can select different codes from code storage 302 to perform ranging operations. As described above, code selection module 306 can select a code based on various criteria. For example, code selection module 306 can select a code that is statically assigned to a vehicle. As another example, code selection module 306 can receive an instruction to select a particular code from a server that assigns the codes among multiple vehicles. In some examples, code selection module 306 can also receive an indication from another LiDAR module of a second vehicle (e.g., via peer-to-peer communication, via a broadcast message, etc.) that both vehicles are using the same code for a ranging operation. Based on the indication, code selection module 306 can switch to another code for the ranging operation, to reduce the risk of interference. In some examples, code selection module 306 can also dynamically change the code with respect to time based on a random function. As different vehicles can transmit a group of signals according to different codes, each vehicle can also identify return signals based on the code the vehicle used for the transmission of signals. Such arrangements can reduce the likelihood of a LiDAR module using the wrong return signal (or other unwanted signal) to perform the ranging operation, which can improve the robustness of the LiDAR module.

FIGS. 3B to 3D illustrate different coding schemes. FIG. 3B illustrates an amplitude/signal level modulation coding scheme in which codes specify the same timing information but different amplitude information for different groups of signals. Referring to FIG. 3B, each group of groups of signals 320a and 320b may be transmitted within a timing window comprising times T0, T1, and T2. Both groups of signals 320a and 320b include a first signal (322a and 322b) and a second signal (324a and 324b) to be transmitted at, respectively, times T0 and T1. But the signal levels of groups of signals 320a and 320b are different, which enables controller 304 to distinguish between groups of signals 320a and 320b. For example, the signal level of first signal 322a of group of signals 320a at time T0 is 0.006, whereas the signal level of first signal 322b of group of signals 320b at time T1 is 0.012. Moreover, the signal level of second signal 324a of group of signals 320a at time T0 is 0.012, whereas the signal level of second signal 324b of group of signals 320b at time T1 is 0.006. In some embodiments, groups of signals 320a and 320b can be represented by codes of, respectively, [0.006, 0.012, 0] and [0.012, 0.006, 0].

The signal levels of the signals in a group of signals can be determined based on various criteria, such as the total transmit signal energy constraint (which can be for safety or for other considerations). For example, the code can be in the form of [A, 0, B], with the signal amplitudes A and B configured based on transmit signal energy constraint. A typical transmit signal energy constraint is 200 nJ. As an example, assuming that a coding scheme is provided in which each signal has a width of 1 ns (which can vary within a range of, for example, 1 ns to 20 ns depending on LiDAR system specification), the transmit signal energy constraint is 4 nJ, and the light source has a power rating of 1 W.

The following are examples of codes that satisfy the signal energy constraint:

Code A: [1, 0, 3]
Code B: [2, 0, 2]
Code C: [3, 0, 1]

In another example, the code can be in the form of [A, B, 0]. The following are examples of codes that satisfy the signal energy constraint:

Code A: [1, 3, 0]
Code B: [2, 2, 0]
Code C: [3, 1, 0]

As another example, the code can be in the form of [A, 0, 0] as a special case. In such a case, the code can be [4, 0, 0].

For each example code above, the total signal energy can be determined by summing the entries and multiplying the sum with 1 ns. The total signal energy for each code is 4 nJ. It is understood that those figures are non-limiting examples and do not limit the scope of this disclosure.

In the coding scheme of FIG. 3B, the minimum signal level differences between the group of signals represented by the codes can be configured based on a resolution of ADC 311. Such arrangements can maximize the number of available codes while allowing controller 304 to distinguish between return signals corresponding to different codes. For example, if ADC 311 can resolve a difference of 0.0001, the signal levels of first and second signals of groups of signals 320 can be configured to differ by the resolvable difference of 0.0001. As an illustrative example, groups of signals 320a and 320b can be represented by codes of, respectively, [0.006, 0.012, 0] and [0.0059, 0.012, 0], with the signal levels of first signals 322a and 322b different by 0.0001. As ADC 311 can resolve the signal level difference between first signals 322a and 322b and generate different digital outputs for groups of signals 320a and 320b, matched filter 312 can also generate different output signals for groups of signals 320a and 320b, which enables return signals identification module 314 to distinguish the two groups of signals. Meanwhile, as the codes have finer signal level differences, the coding scheme can be expanded to represent a larger set of groups of signals having different signal level patterns. The expanded coding scheme allows a larger number of vehicles to perform robust ranging operations with reduced or zero interferences.

FIG. 3C illustrates a position modulation coding scheme in which codes specify the same amplitude information but different timing information for different groups of signals. Referring to FIG. 3C, each group of groups of signals 330a and 330b may be transmitted within a timing window comprising times T0, T1, and T2. Both groups of signals 330a and 330b include a first signal (332a and 332b) and a second signal (334a and 334b). First signals 332a and 332b can have identical or very similar signal levels, whereas second signals 334a and 334b can also have identical or very similar signal levels. But groups of signals 330a and 330b have different times of transmission, which enables controller 304 to distinguish between groups of signals 330a and 330b. For example, while both first signals 332a and 332b are to be transmitted at time T0, second signal 334a is to be transmitted at time T1, whereas second signal 334b is to be transmitted at time T2. In some embodiments, groups of signals 330a and 330b can be represented by codes of, respectively, [0.006, 0.006, 0] and [0.006, 0, 0.006].

FIG. 3D illustrates a combined amplitude and position modulation coding scheme in which codes specify different amplitude information and different timing information for different groups of signals. Referring to FIG. 3D, each group of groups of signals 340a and 340b may be transmitted within a timing window comprising times T0, T1, and T2. Both groups of signals 340a and 340b include a first signal (332a and 332b) and a second signal (334a and 334b). Groups of signals 320a and 320b have different signal levels and different times of transmissions, which enable controller 304 to distinguish between groups of signals 340a and 340b. For example, first signal 342a of group of signals 340a has a signal level of 0.012, whereas first signal 342b of group of signals 340b has a signal level of 0.006. Second signal 344a of group of signals 340a has a signal level of 0.006, whereas second signal 344b of group of signals 340b has a signal level of 0.012. Moreover, first signal 342a and second signal 344a of group of signals 340a are to be transmitted at, respectively, times T0 and T1, whereas first signal 342b and second signal 344b of group of signals 340b are to be transmitted at, respectively, times T0 and T2. In some embodiments, groups of signals 340a and 340b can be represented by codes of, respectively, [0.012, 0.006, 0] and [0.006, 0, 0.012].

Compared with the coding schemes of FIG. 3B and FIG. 3C, the coding scheme in FIG. 3D can improve the performance of controller 304 in detecting and distinguishing between groups of signals in the presence of noise and measurement errors, while expanding the coding scheme. Specifically, in the coding scheme of FIG. 3B, controller 304 detects and distinguishes between the return signals of groups of signals 320a and 320b based solely on the differences in the signal levels, whereas in the coding scheme of FIG. 3C, controller 304 detects and distinguishes between the return signals of groups of signals 330a and 330b based solely on the differences on the timing differences. But the signal levels and the timing of the returns signals can be affected by noise. Moreover, receiver 204, as well as the processing circuits of controller 304, may have finite resolution, and both can introduce measurement errors. By introducing variations in both the signal levels and timing, controller 304 can distinguish between groups of signals 340a and 340b based on either or both of signal level and timing differences. As a result, the detection of the return signals can become more robust against noise and measurement errors. Moreover, by varying both the transmission times and signal levels, the coding scheme can be expanded to represent a larger set of groups of signals having different patterns of transmission times and signal levels. The expanded coding scheme allows a larger number of vehicles to perform robust ranging operations with reduced or zero interferences.

Referring back to FIG. 3A, matched filter 312 can be configured based on the selected code from code selection module 306. The configured matched filter 312 can process digitized received signals from ADC 311 to generate a pattern of output signals indicative of whether the received signals include return signals that match the selected code. Specifically, matched filter 312 can be configured to generate a pattern of output signals based on the following equation:

$$y[n]=\Sigma_{k=-\infty}^{k=+\infty}h[n-k]\times x[k] \quad \text{(Equation 2)}$$

In Equation 2, the function h represents a matched filter function, the function x represents a series of digitalized received signals from ADC 311, whereas the function y represents a set of output signals of the matched filter. A discrete convolution operation can take place between the matched filter function h and the digitized received signals x to generate the set of output signals y.

Figure 4A:
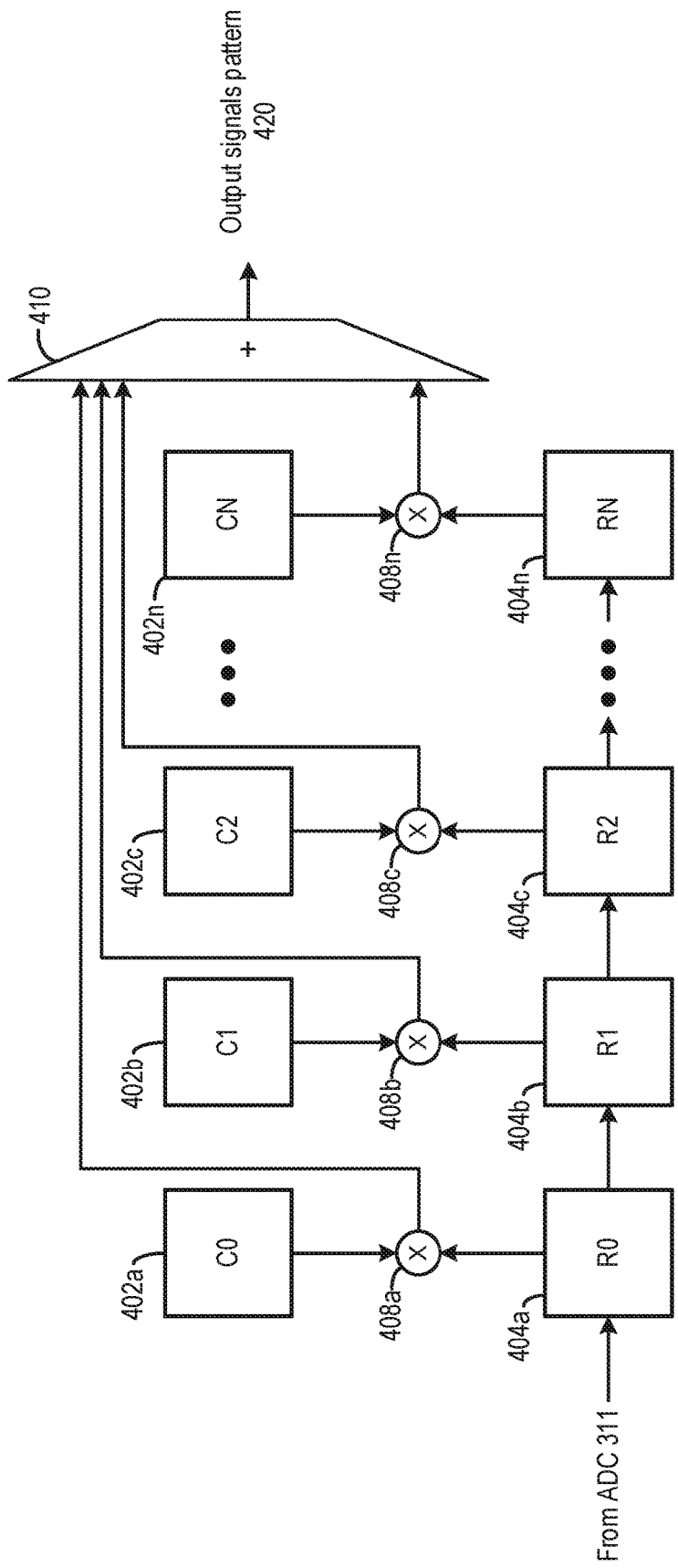
FIG. 4A-FIG. 4D illustrate examples of internal components of the ranging system of FIG. 3A-FIG. 3D, according to embodiments of the present disclosure.
Figure 4B:
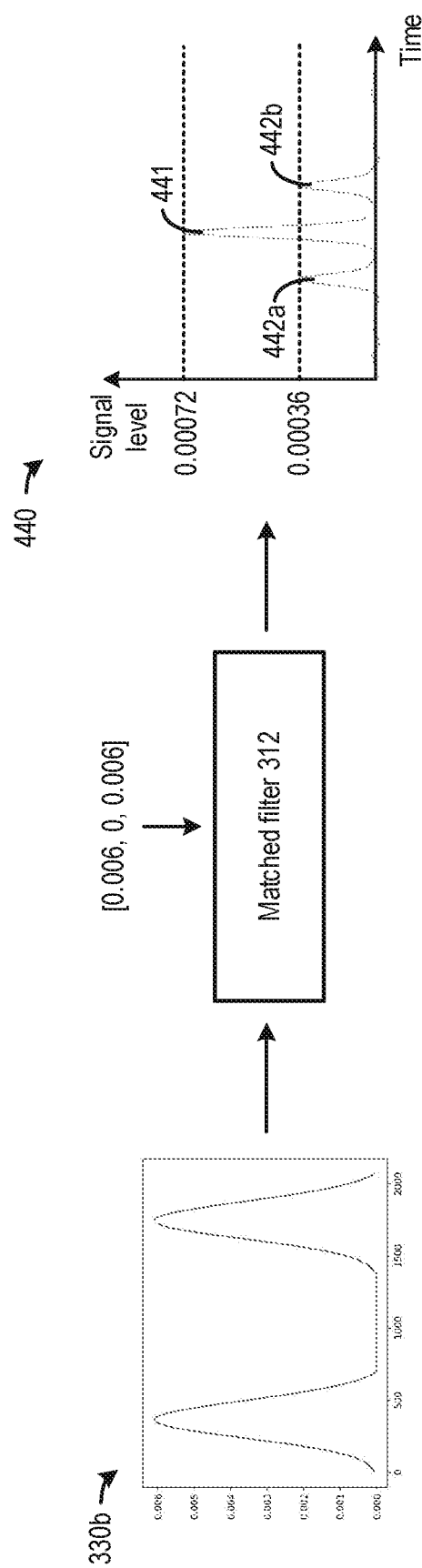
Figure 4C:
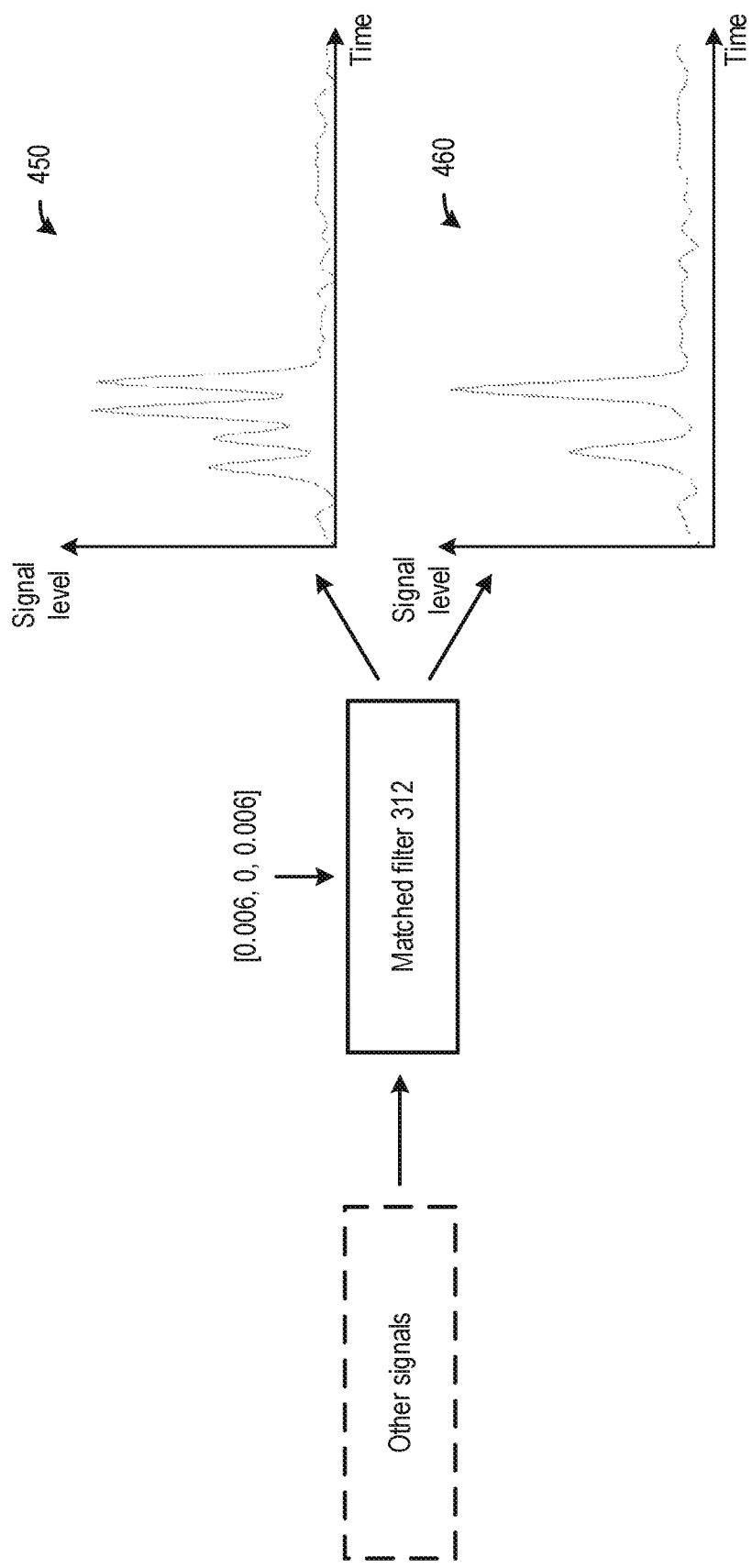
Figure 5:
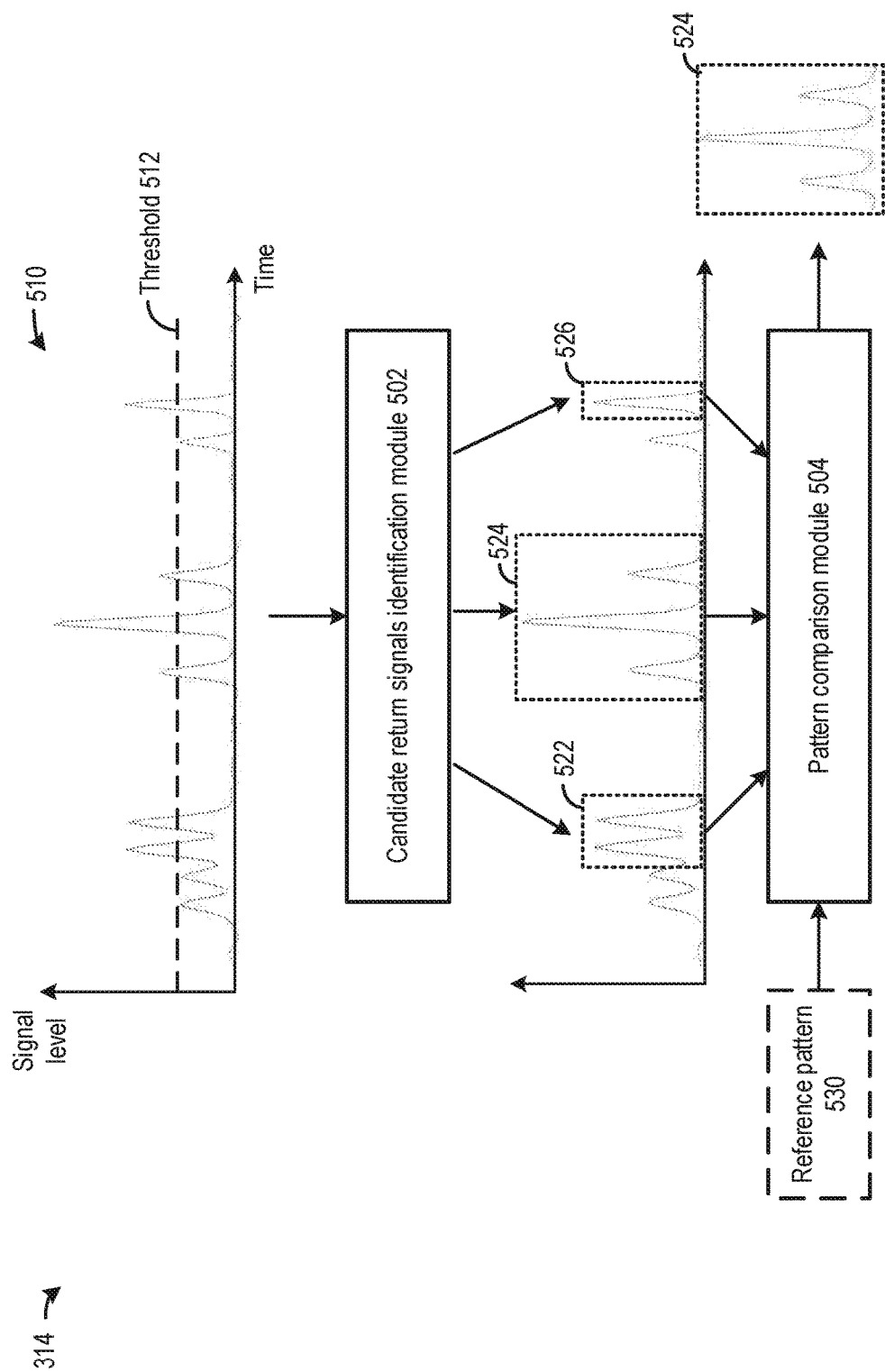
FIG. 5 illustrates examples of internal components of the ranging system of FIG. 3A-FIG. 3D, according to embodiments of the present disclosure.

FIG. 4A-FIG. 4C illustrate examples of internal components of matched filter 312 and their operations. As shown in FIG. 4A, matched filter 312 can include a set of coefficient registers 402 (e.g., coefficient registers 402a, 402b, 402c, 402n, etc.), a set of input registers 404 (e.g., input registers 404a, 404b, 404c, 404n, etc.), a set of multipliers 408 (e.g., multipliers 408a, 408b, 408c, 408n, etc.), and an adder 410. Each coefficient register corresponds to one input register (e.g., coefficient register 402a corresponds to input register 404a), and each of multipliers 408 can compute a product between the coefficient and the input signal stored in the corresponding coefficient register and input register. Coefficient registers can be programmed to store a time-reversal version of a code selected by code selection module 306 to represent the function h in Equation 2. For example, in a case where code selection module 306 selects a code representing group of signals 330b ([0.006, 0, 0.006]) for a ranging operation, coefficient register 402a can store a value of 0.006, coefficient register 402b can store a value of zero, whereas coefficient register 402c can store a value of 0.006. In some examples, the coefficients stored in coefficient registers 402 can also be computed based on the selected code as well as a noise covariance matrix, to account for noise. For example, the coefficients can be computed by multiplying the inverse of the noise covariance matrix with the selected code (which represents a transmit signals vector). Input registers 404 can operate as a shift register to shift one input signal (from ADC 311) to the right at a time. The products between the corresponding coefficient registers and input registers can be summed by adder 410 to generate an output signal. As input registers 404 continue to shift in the received signals from ADC 311, a pattern of output signals 420 from adder 410 can be generated according to Equation 2. The pattern of output signals 420 and the corresponding received signals can be stored in a memory.

FIG. 4B and FIG. 4C illustrate examples of output signals of matched filter 312. In both FIG. 4B and FIG. 4C, coefficient registers 402 of matched filter 312 store the code representing group of signals 330b ([0.006, 0, 0.006]). In FIG. 4B, return signals including group of signals 330b (which matches with the code [0.006, 0, 0.006]) are processed by matched filter 312 to generate an output signals pattern 440. Output signals pattern 440 can be represented by a vector [0.00036, 0, 0.00072, 0, 0.00036, 0] representing the convolution between group of signals 330b ([0.006, 0, 0.006]) and matched filter coefficients [0.006, 0, 0.006], and can include a main lobe 441 (with signal level 0.00072) and two side lobes 442a and 442b (with signal level 0.00036) around main lobe 441. The signal levels of output signals pattern 440 can also be scaled due to attenuation and partial reflectance as described in Equation 1. In FIG. 4C, matched filter 312 processes other signals which do not match the code [0.006, 0, 0.006] to generate output signals 450 and 460, both of which do not match output signals pattern 440 of FIG. 4B.

Figure 4D:
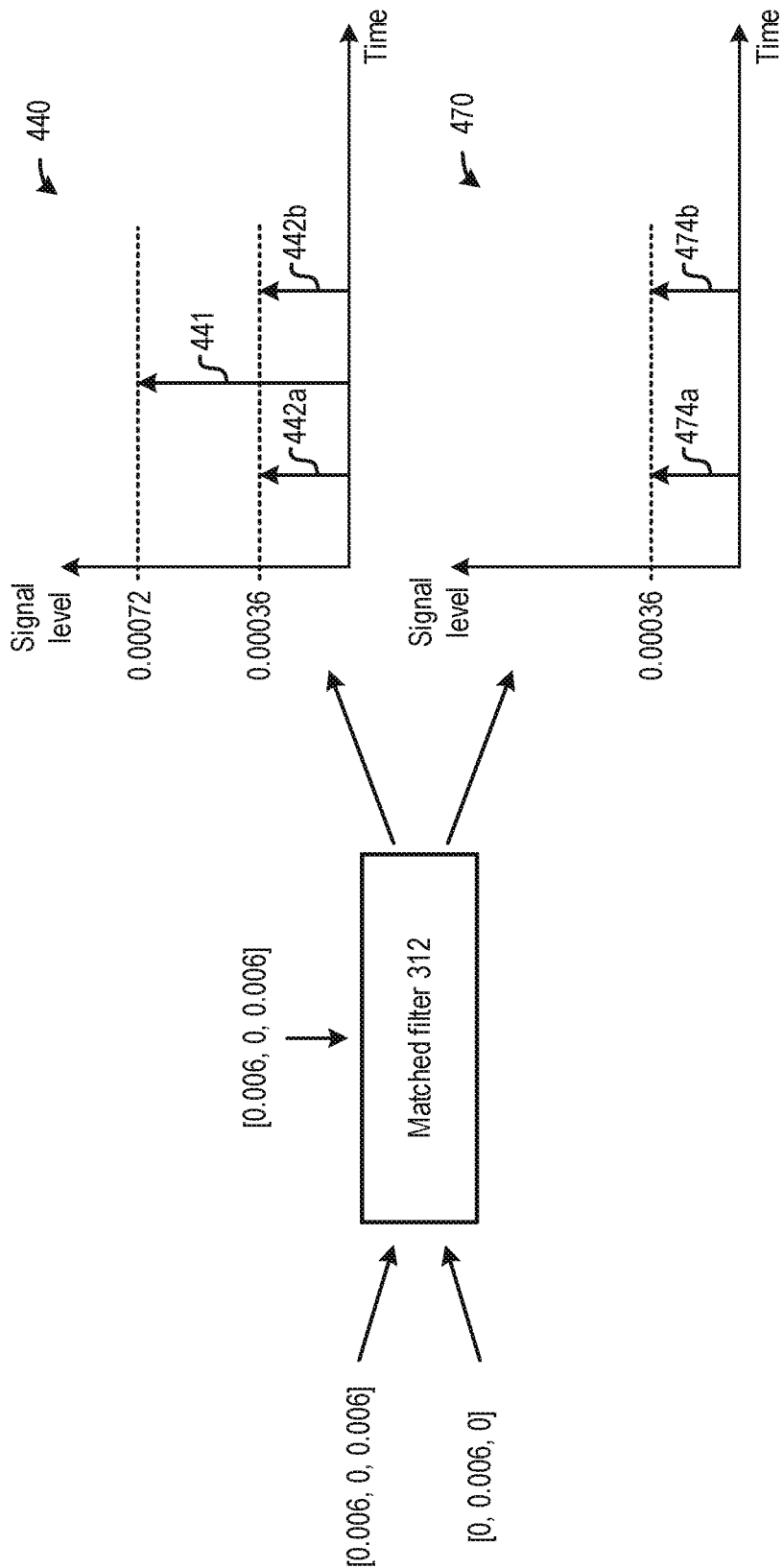

The codes in code storage 302 can be configured to maximize the differences in the matched filter outputs of matching input signals and of mismatching input signals, to improve the likelihood of identifying return signals from signals received by receiver circuit 204. The maximizing can be based on configuring the codes to maximize the main lobe of the matched filter output (in the case of matching input signals) and/or to minimize the side lobe of the matched filter output (in the case of mismatching input signals). FIG. 4D illustrates such an example. As shown in FIG. 4D, matched filter 312 may be configured with code [0.0006, 0, 0.0006] which corresponds to group of signal 330b. Matched filter 312 can processes group of signals 330b to generate output signals pattern 440 having main lobe 441 (having a signal level of 0.00072) and side lobes 442a and 442b (having a signal level of 0.00036), as described above. In contrast, when matched filter 312 processes a group of signals 470 represented by code [0, 0.0006, 0], which has a high degree of orthogonality with respect to code [0.0006, 0, 0.0006], it generates an output signals pattern 472 that only includes side lobes 474a and 474b (both having signal level of 0.00036) and does not have a main lobe. The absence of a main lobe in output signals pattern 472 greatly amplifies the differences between output signals pattern 472 and output signals pattern 440, which can increase the likelihood of identifying the correct return signals based on comparing the output signals patterns. Moreover, the codes representing groups of signals 330a and 330b can be configured (in amplitude information, in timing information, etc.) to maximize main lobe 441 and/or to minimize side lobes 442a, 442b, 474a and 474b, to maximize the degree of orthogonality between the two groups of signals.

FIG. 5 illustrates an example of internal components of return signals identification module 314 and their operations. As shown in FIG. 5, return signals identification module 314 can include a candidate return signals identification module 502 and a pattern comparison module 504. Candidate return signals identification module 502 can receive output signals 510 from matched filter 312 and compare the output signals against a threshold 512 to identify candidate return signals. Threshold 512 can be configured to filter out noise signals and to reduce the number of candidate return signals. In some examples, threshold 512 can be computed according to a desired probability of false detection of candidate return signals, to balance between correctly identifying candidate return signals and filtering noise signals, based on techniques described in related patent application Ser. No. 16/290,660, which is hereby incorporate by reference in its entirety for all purposes, as recited above. In the example of FIG. 4D, candidate return signals 522, 524, and 526 are identified based on their signal levels exceeding threshold 512. Pattern comparison module 504 can then compare each set of candidate return signals 522, 524, and 526 with a reference pattern 530 representing the selected code from code selection module 306. The comparison can be based on, for example, determining whether each set of candidate return signals 522, 524, and 526 is linearly related to reference pattern 530. In some examples, return signals identification module 314 can generate reference pattern 530 based on an autocorrelation function of the selected code, which can be obtained based on Equation 2 above with the selected code being provided as the input signals (x) and the matched filter function (h). In FIG. 4D, reference pattern 530 can be set as output signals pattern 440 of FIG. 4D and can be represented by a vector [0.00036, 0, 0.00072, 0, 0.00036, 0]. In some examples, code storage 302 can store reference patterns associated with the codes, and return signals identification module 314 can also obtain reference pattern 530 from code storage 302. Based on comparison results, pattern comparison module 504 may determine and identify candidate return signals 524 as matching reference pattern 530. Pattern comparison module 504 can then identify, from the memory, the received signals that correspond to candidate return signals 524. The received signals can be identified as the return signals of previously-transmitted signals. The identified signals and the associated timestamps can then be forwarded to ranging operation module 212 to perform the ranging operation.

Figure 6A:
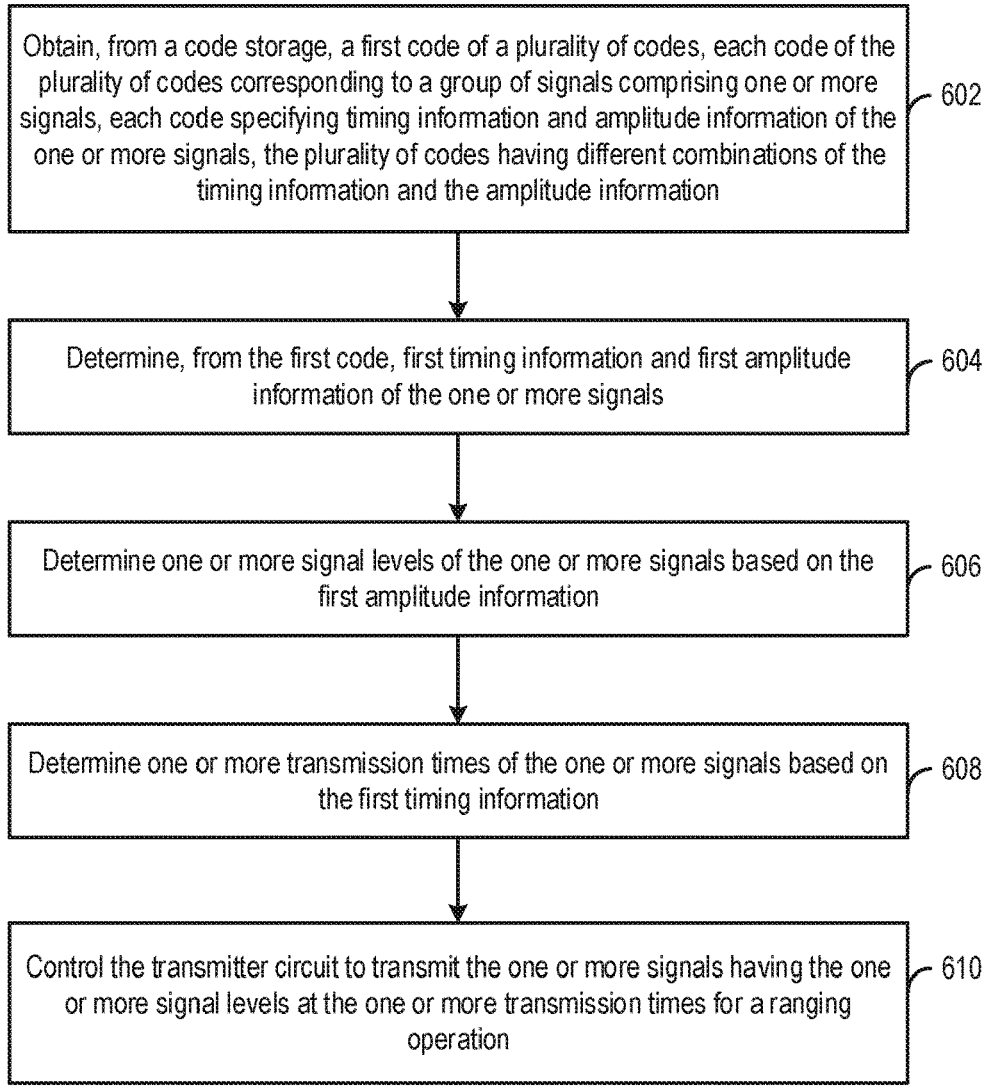
FIG. 6A and FIG. 6B illustrate flowcharts of methods for performing a ranging operation, according to certain embodiments.
Figure 6B:
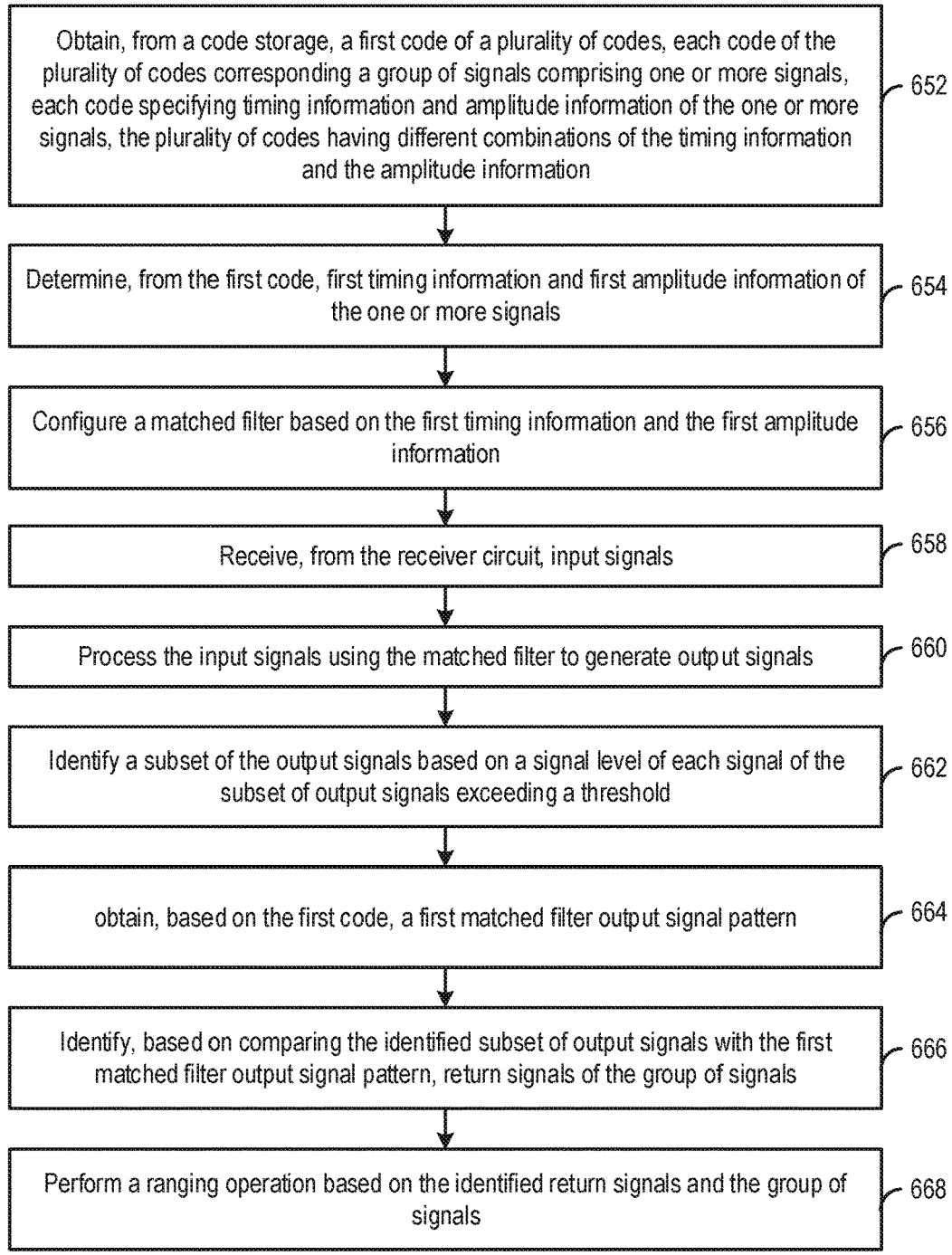

FIG. 6A and FIG. 6B illustrate example flowcharts of methods of performing a ranging operation. FIG. 6A illustrates a flowchart of a method 600 performed by, for example, controller 304 to transmit signals for a ranging operation, whereas FIG. 6B illustrates a flowchart of a method 650 performed by controller 304 to process received signals for the ranging operation.

Referring to FIG. 6A, method 600 starts with step 602, in which code selection module 306 of controller 304 can select a first code of a plurality of codes from code storage 302. Each code of the plurality of codes corresponds to a group of signals comprising one or more signals, each code specifying timing information and amplitude information of the one or more signals. The group of signals are to be transmitted by transmitter 202 within a timing window. The timing window, as well as the length of each code, can be configured based on a system behavior of LiDAR system 300, such as a scanning period, a scanning pattern, etc., as described above. Each group of signals can include a predetermined number of signals. The number of signals can be determined based on, for example, the power rating of the signal source (e.g., a laser source), a transmit energy constraint due to safety requirement, etc.

The plurality of codes stored in code storage 302 may have different combinations of the timing information and the amplitude information. The timing information may specify, for example, a time of transmission of each signal within the timing window, whereas the amplitude information may specify the signal level of each signal. The plurality of codes in code storage may have different combinations of the timing information and the amplitude information, such that each group of signals is unique in terms of, for example, the time of transmissions of the signals, the signal levels of the signals, or a combination of both. The plurality of codes stored in code storage 302 can be configured to prevent or mitigate interferences between return signals. Examples of the codes and the groups of signals represented by the codes are described in, for example, FIGS. 3B-3D.

Code selection module 306 can select a code based on various criteria. For example, code selection module 306 can select a code that is statically assigned to a vehicle. As another example, code selection module 306 can receive an instruction to select a particular code from a server that assigns the codes among multiple vehicles. In some examples, code selection module 306 can also receive an indication from another LiDAR module of a second vehicle (e.g., via peer-to-peer communication, via a broadcast message, etc.) that both vehicles are using the same code for a ranging operation. Based on the indication, code selection module 306 can switch to another code for the ranging operation, to reduce the risk of interference. In some examples, code selection module 306 can also dynamically change the code with respect to time based on a random function. As different vehicles can transmit a group of signals according to different codes, each vehicle can also identify return signals based on the code the vehicle used for the transmission of signals.

In step 604, signal generator 208 can determine, from the first code, first timing information and first amplitude information of the one or more signals. For example, referring to FIG. 3A, the first code (e.g., code 1) may specify that a signal having a signal level A0 is to be transmitted at time T0, no signal is to be transmitted at time T1, and a signal having a signal level AN is to be transmitted at time TN. The signal levels A0, 0, AN, etc. can be part of the first amplitude information, whereas the transmission times T0, T1, TN, etc. can be part of the first timing information.

In step 606, signal generator 208 can determine one or more signals of the one or more signals based on the first amplitude information. Referring to FIG. 3A, signal generator 208 may determine signals levels A0, 0, AN, etc. from the first amplitude information.

In step 608, signal generator 208 can determine one or more transmission times of the one or more signals based on the first timing information. Referring to FIG. 3A, signal generator 208 may determine the transmission times T0, T1, TN, etc. from the first timing information.

In step 610, signal generator 208 can control transmitter circuit 202 to transmit the one or more signals having the one or more signal levels at the one or more transmission times for a ranging operation. For example, signal generator 208 can control transmitter circuit 202 to transmit a signal having a signal level of A0 at time T0, a signal having a signal level of 0 at time T1, a signal having a signal level of AN at time TN, etc. The one or more signals can be reflected off an object to generate one or more return signals. Controller 304 can perform method 650 (to be described below) to identify the return signals, and to determine timing differences in timing between the transmission of the one or more signals and the reception of the return signals. Based on the timing differences, controller 304 can determine a ranging operation including, for example, a distance between the object and the apparatus, a reflectivity of the object (e.g., to identify the object), etc.

Referring to FIG. 6B, method 650 starts with step 652 in which controller 304 can select the first code of a plurality of codes from code storage 302. Controller 304 may have transmitted one or more signals based on the first code (based on method 600) and selects the first code again to detect return signals of the transmitted one or more signals.

In step 654, controller 304 can determine, from the first code, first timing information and first amplitude information of the transmitted one or more signals. For example, referring to FIG. 4A, the first code may [0.006, 0, 0.006]. The values 0.006 and 0 can be part of the first amplitude information, whereas sequential order of the values 0.006, 0, and 0.006 can be the first timing information.

In step 656, controller 304 can configure a matched filter, such as matched filter 312 of FIG. 4A, based on the first timing information and the first amplitude information. For example, matched filter 312 can be configured based on a time-reversal version of the first code.

In step 658, controller 304 can receive, from a receiver circuit (e.g., receiver circuit 204), input signals. The input signals may include return signals of the transmitted one or more signals as well as other signals (e.g., noise signals, return signals targeted at other vehicles, etc.) which are not supposed to be used by controller 304 to perform the ranging operation.

In step 660, controller 304 can process the input signals using the configured matched filter to generate output signals. The input signals can be digitized by, for example, ADC 311, and the configured matched filter 312 can process the digitalized input signals based on, for example, Equation 2 above. The output signals may include, for example, main lobes and side lobes.

In step 662, controller 304 can identify a subset of the output signals based on a signal level of each signal of the subset of output signals exceeding a threshold. The subset of the output signals can be candidate return signals of the transmitted one or more signals corresponding to the first code. As shown in FIG. 5, the output signals can be compared against a threshold 512. In some examples, threshold 512 can be configured to filter out noise signals and to reduce the number of candidate return signals. In some examples, threshold 512 can be computed according to a desired probability of false detection of candidate return signals, to balance between correctly identifying candidate return signals and filtering noise signals. The subset of the output signals identified may include, for examples, signals 522, 524, and 526 of FIG. 5.

In step 664, controller 304 can obtain, based on the first code, a first matched filter output signal pattern. In some examples, controller 304 can generate the first matched filter output signal pattern based on computing an autocorrelation function between the first code and the configured matched filter coefficients. In some examples, controller 304 can obtain the first matched filter output signal pattern from code storage 302.

In step 666, controller 304 can identify, based on comparing the identified subset of output signals with the first matched filter output signal pattern, return signals of the transmitted one or more signals. The comparison can be based on, for example, determining which of the identified subset of output signals is linearly related to the first matched filter output signal pattern.

In step 668, controller 304 can perform the ranging operation based on the identified return signals and the transmitted one or more signals. The ranging operation can be performed based on, for example, a difference between the time of transmission of the one or more signals and the time of reception of the identified return signals. The difference can correspond to a time-of-flight of the one or more signals and can be used to determine, for example, a distance between the apparatus and an object that reflects the return signals, the reflectivity of the object, etc.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. An apparatus, the apparatus being part of a Light Detection and Ranging (LiDAR) module of a vehicle and comprising a transmitter circuit, a controller, and a code storage;
   wherein the code storage stores a plurality of codes, each code of the plurality of codes corresponding to a group of signals comprising one or more signals, each code specifying timing information and amplitude information of the one or more signals, the plurality of codes each having a different combination of the timing information and the amplitude information from one another; and
   wherein the controller is configured to:
      obtain, from the code storage, a first code of the plurality of codes;
      determine, from the first code, first timing information and first amplitude information of a corresponding first group of one or more signals;
      determine one or more signal levels of the first group of one or more signals based on the first amplitude information;
      determine one or more transmission times of the first group of one or more signals based on the first timing information; and
      control the transmitter circuit to transmit the first group of one or more signals having the one or more signal levels at the one or more transmission times.

2. The apparatus of claim 1, wherein the plurality of codes further comprises a second code corresponding to a second group of one or more signals; and
   wherein the first code and the second code have different amplitude information.

3. The apparatus of claim 2,
   wherein the first group of one or more signals comprises a first signal and a second signal;
   wherein the second group of one or more signals comprises a third signal and a fourth signal;
   wherein the second code specifies second amplitude information;
   wherein the first amplitude information specifies the first signal having a first signal level and the second signal having a second signal level;
   wherein the second amplitude information specifies the third signal having a third signal level and the fourth signal having a fourth signal level; and
   wherein at least one of:
      the first signal level and the third signal level are specified to be different; or
      the second signal level and the fourth signal level are specified to be different.

4. The apparatus of claim 3, wherein at least one of:
   the first signal level and the second signal level are specified to be identical; or
   the third signal level and the fourth signal level are specified to be identical.

5. The apparatus of claim 1, wherein the plurality of codes further comprises a second code corresponding to a second group of one or more signals; and
   wherein the first code and the second code have different timing information for transmissions of the first group of one or more signals and the second group of one or more signals.

6. The apparatus of claim 5,
   wherein the first group of one or more signals comprises a first signal and a second signal;
   wherein the second group of one or more signals comprises a third signal and a fourth signal;
   wherein the second code specifies second timing information;
   wherein the first timing information specifies a first time of transmission and a second time of transmission of, respectively, the first signal and the second signal;
   wherein the second timing information specifies a third time of transmission and a fourth time of transmission of, respectively, the third signal and the fourth signal; and wherein at least one of:
the first time of transmission and the third time of transmission are specified to be different; or
the second time of transmission and the third time of transmission are specified to be different.

7. The apparatus of claim 1, wherein the plurality of codes further comprises a second code; and
wherein the first code have different timing information and different amplitude information than the second code.

8. The apparatus of claim 1, wherein the controller is configured to:
receive an indication that another vehicle transmits a group of signals corresponding to the first code; and
based on the indication:
obtain, from the code storage, a second code;
determine, from the second code, second timing information and second amplitude information of a second group of one or more signals; and
control the transmitter circuit to transmit the second group of one or more signals based on the second timing information and the second amplitude information.

9. The apparatus of claim 8, wherein the indication is received from a server communicatively coupled with a plurality of vehicles.

10. The apparatus of claim 8, wherein the indication is received via a peer-to-peer communication channel with another vehicle.

11. The apparatus of claim 1, wherein the controller is configured to generate the first code based on a random function.

12. An apparatus, the apparatus being part of a Light Detection and Ranging (LiDAR) module of a vehicle and comprising a receiver circuit, a controller, and a code storage;
wherein the code storage stores a plurality of codes, each code of the plurality of codes corresponding to a group of signals comprising one or more signals, each code specifying timing information and amplitude information of the one or more signals, the plurality of codes each having a different combination of the timing information and the amplitude information from one another; and
wherein the controller is configured to:
obtain, from the code storage, a first code of the plurality of codes, the first code corresponding to a first group of one or more signals previously transmitted by the apparatus;
determine, from the first code, first timing information and first amplitude information of the first group of one or more signals;
configure a matched filter based on the first timing information and the first amplitude information;
receive input signals from the receiver circuit;
process the input signals using the matched filter to generate output signals;
identify, based on a result of comparing the output signals with a threshold, return signals of the first group of one or more signals corresponding to the first code; and
perform a ranging operation based on the identified return signals and the first group of one or more signals.

13. The apparatus of claim 12, wherein the controller is configured to identify a subset of the output signals based on a signal level of each signal of the subset of the output signals exceeding the threshold.

14. The apparatus of claim 13, wherein the controller is configured to:
generate, based on the first code, a first matched filter output signal pattern; and
identify, based on comparing the identified subset of output signals with the first matched filter output signal pattern, the return signals of the first group of one or more signals.

15. The apparatus of claim 13, wherein the controller is configured to:
obtain, based on the first code, a first matched filter output signal pattern from the code storage; and
identify, based on comparing the identified subset of output signals with the first matched filter output signal pattern, the return signals of the first group of one or more signals.

16. The apparatus of claim 12, further comprising an analog-to-digital converter (ADC) configured to digitize the input signals; and
wherein the matched filter is implemented on a digital signal processor to process the digitized input signals.

17. The apparatus of claim 12, wherein the matched filter is configured based on a time-reversal operation of the first group of one or more signals corresponding to the first code.

18. The apparatus of claim 12, wherein the plurality of codes further comprises a second code that specifies second amplitude information and second timing information of a second group of one or more signals; and
wherein at least one of:
the first amplitude information and the second amplitude information are different; or
the first timing information and the second timing information are different.

19. An apparatus, the apparatus being part of a Light Detection and Ranging (LiDAR) module of a vehicle and comprising a transmitter circuit, a receiver circuit, a controller, and a code storage;
wherein the code storage stores a plurality of codes, each code of the plurality of codes corresponding to a group of signals comprising one or more signals, each code specifying timing information and amplitude information of the one or more signals, the plurality of codes each having a different combination of the timing information and the amplitude information from one another; and
wherein the controller is configured to:
obtain, from the code storage, a first code of the plurality of codes;
determine, from the first code, first timing information and first amplitude information of a corresponding first group of one or more signals;
determine one or more signal levels of the first group of one or more signals based on the first amplitude information;
determine one or more transmission times of the first group of one or more signals based on the first timing information;
control the transmitter circuit to transmit the first group of one or more signals having the one or more signal levels at the one or more transmission times;
configure a matched filter based on the first timing information and the first amplitude information;
receive input signals from the receiver circuit;
process the input signals using the matched filter to generate output signals;

identify, based on a result of comparing the output signals with a threshold, return signals of the first group of one or more signals corresponding to the first code; and perform a ranging operation based on the identified return signals and the first group of one or more signals.

20. The apparatus of claim 19, wherein the controller is configured to perform the ranging operation based on a difference between the one or more transmission times of the first group of one or more signals at the transmitter circuit and one or more reception times of the identified return signals at the receiver circuit.

* * * * *